United States Patent
Suzuki et al.

(10) Patent No.: US 7,659,926 B2
(45) Date of Patent: Feb. 9, 2010

(54) IMAGING APPARATUS AND IMAGING METHOD

(75) Inventors: Takeshi Suzuki, Akiruno (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 479 days.

(21) Appl. No.: 11/598,509

(22) Filed: Nov. 13, 2006

(65) Prior Publication Data

US 2007/0109428 A1    May 17, 2007

(30) Foreign Application Priority Data

Nov. 15, 2005    (JP)    ............................. 2005-330463

(51) Int. Cl.
*H04N 5/76*    (2006.01)
*H04N 5/222*    (2006.01)
*H04N 5/225*    (2006.01)

(52) U.S. Cl. .............................. 348/231.2; 348/333.02; 348/220.1

(58) Field of Classification Search ............... 348/231.2, 348/333.02, 220.1, 231.3
See application file for complete search history.

(56) References Cited

U.S. PATENT DOCUMENTS

| | | | | |
|---|---|---|---|---|
| 6,292,215 | B1 * | 9/2001 | Vincent ........................ | 348/169 |
| 6,538,698 | B1 * | 3/2003 | Anderson .............. | 348/333.05 |
| 6,819,783 | B2 * | 11/2004 | Goldberg et al. ............. | 382/115 |
| 7,239,347 | B2 * | 7/2007 | Yamamoto et al. ........ | 348/231.2 |
| 2004/0264810 | A1 * | 12/2004 | Taugher et al. ............... | 382/305 |
| 2005/0052550 | A1 * | 3/2005 | Sato .......................... | 348/231.2 |
| 2005/0110879 | A1 * | 5/2005 | Izume et al. .............. | 348/231.2 |
| 2005/0219367 | A1 * | 10/2005 | Kanda et al. .............. | 348/207.2 |
| 2007/0003113 | A1 * | 1/2007 | Goldberg ..................... | 382/118 |
| 2007/0098303 | A1 * | 5/2007 | Gallagher et al. ............ | 382/305 |

FOREIGN PATENT DOCUMENTS

JP    2001-86405    3/2001
JP    2004-157923    6/2004

* cited by examiner

*Primary Examiner*—James M Hannett
(74) *Attorney, Agent, or Firm*—Straub & Pokotylo; John C. Pokotylo (57) ABSTRACT

In an imaging apparatus capable of continuous shooting, the continuously shot image data are sequentially recorded, and some image data selected from the recoded image data are displayed on a display portion. At this selection, data associated with the shooting period of the image data is divided into approximately equal time intervals, and image data corresponding to shooting time positions of the approximately equally divided time intervals are selected.

13 Claims, 9 Drawing Sheets

IMAGING APPARATUS AND IMAGING METHOD

CROSS-REFERENCE TO RELATED APPLICATION

This application is based upon and claims the benefit of priority from prior Japanese Patent Application No. 2005-330463, filed on Nov. 15, 2005, the entire contents of which are incorporated herein by reference.

BACKGROUND OF THE INVENTION

1. Field of the Invention

The present invention relates to the improvement of an imaging apparatus and imaging method capable of a continuous shooting.

2. Description of the Related Art

In a typical camera capable of continuous shooting, a shutter repeatedly fires while a release button is being pressed down so that all the shot images captured during that period will be recorded as individual images. The recorded images are displayed on a camera-mounted display device to allow a user to check the images.

For example, there is an application relating to a camera having a multi-picture display function for displaying a plurality of still images arranged and displayed on one screen (see Japanese Patent Laid-Open No. 2001-86405). In this camera, a shooting period is divided into time blocks, and some time blocks are selected from the divided time blocks and displayed at equally spaced intervals.

Figure 9A:
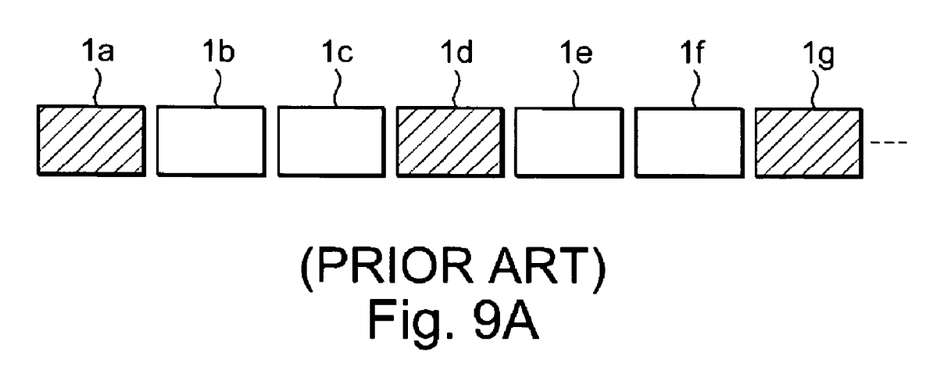
FIGS. 9A to 9B are illustrations for explaining a conventional multi-picture display function.
Figure 9B:
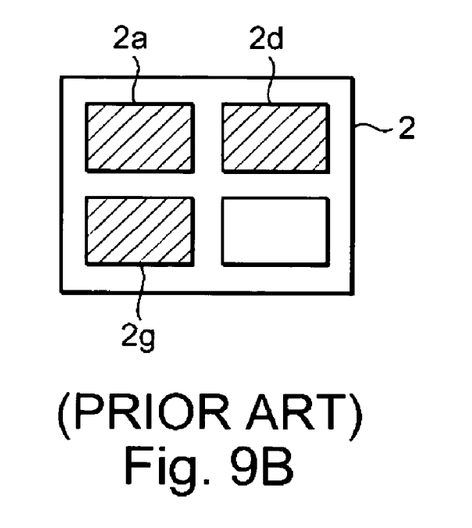

In the camera having the above-mentioned multi-picture display function, shot images are once recorded in an external memory, for example, in the order of frames 1a to 1g as shown in FIG. 9A. Then, the once recorded shot images are read and processed in a playback mode to provide a multi-picture display as shown in FIG. 9B.

On the other hand, face detection techniques for detecting a face part from image data are conventionally known. As an example, Japanese Patent Laid-Open No. 2004-157923 discloses a person recognition device using such a face detection technique.

BRIEF SUMMARY OF THE INVENTION

The present invention relates to an imaging apparatus capable of continuous shooting. The imaging apparatus of the present invention records image data of continuous shots sequentially in series to display on a display part image data selected from all the image data recorded. In this selection process, data associated with the shooting period of the image data (shooting time, order of shooting, etc.) is divided into approximately equal time intervals, and the image data corresponding to each shooting time position of the approximately equally divided time intervals are selected.

For example, the imaging apparatus can be configured such that, when a user finds a favorite image(s) among the displayed images, the displayed images can be recorded in a removable memory or the like for permanent archival storage. The imaging apparatus can also be configured such that, when the user likes none of the displayed images, the divided time intervals can be time-shifted to re-select image data.

Further, the imaging apparatus can be configured to select images, as one of the selection conditions, on which a face of human appear at a predetermined position.

As an exemplary structure of the present invention, an imaging apparatus capable of continuous shooting comprises: an imaging part for capturing a subject image to generate an image signal; an imaging processing part for creating image data according to the image signal; a first recording part for recording the image data sequentially; a measurement part for measuring data associated with a shooting period; a dividing part for dividing the data associated with the shooting period into approximately equal time intervals; an image selection part for selecting, from among the image data recorded in the first memory, image data corresponding to shooting time positions of the approximately equally divided time intervals; and a display part for displaying the image data selected.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Figure 1:
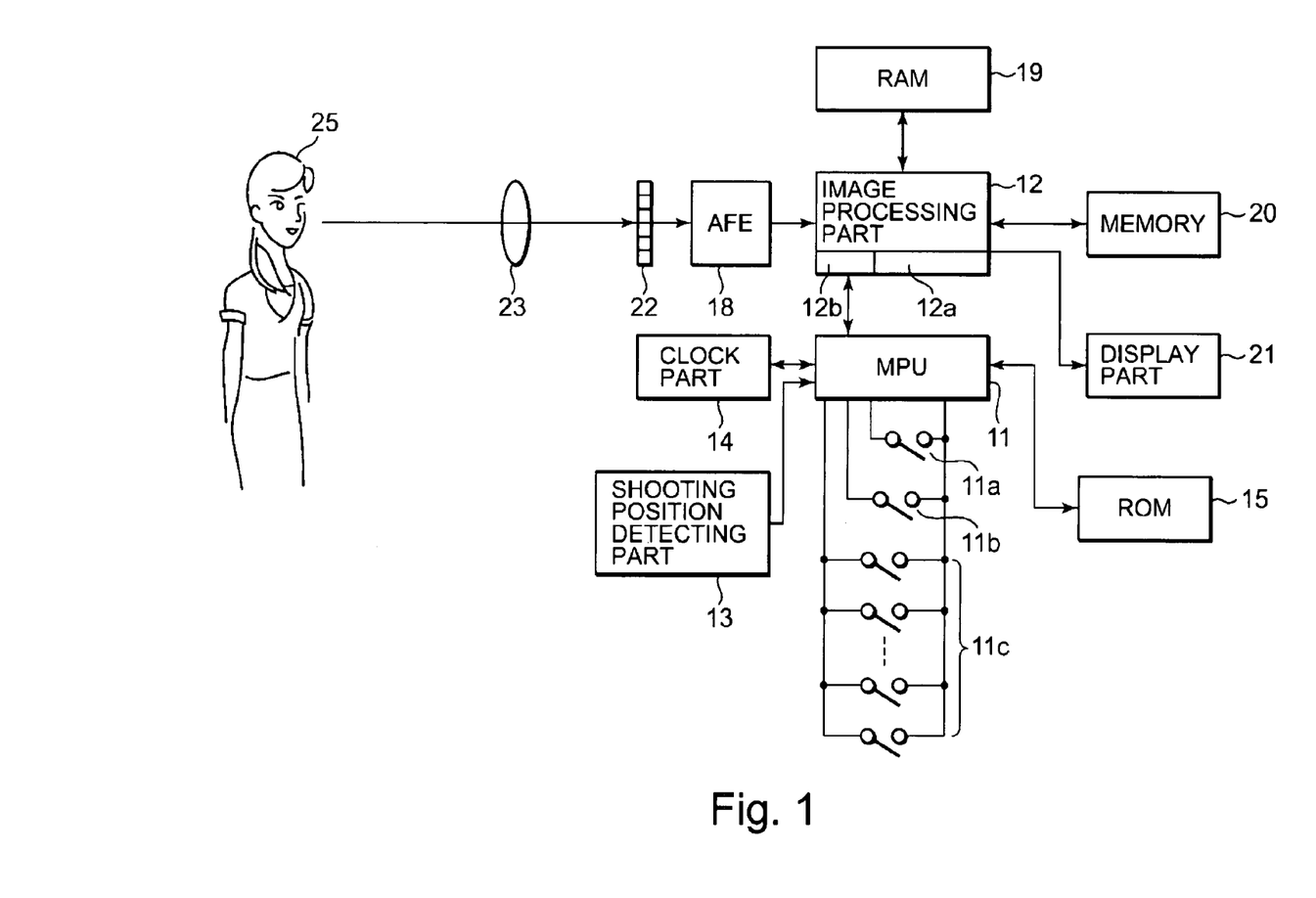
FIG. 1 is a block diagram showing the basic structure of a camera according to a preferred embodiment of the present invention.

FIG. 1 is a block diagram showing the basic structure of a camera according to a preferred embodiment of the present invention. This camera includes a main CPU (hereinafter abbreviated as "MPU") 11, a plurality of switches 11a, 11b, 11c, an image processing part 12, a shooting position detecting part 13, a clock part 14, a ROM 15, an analog front-end part (AFE) 18, a RAM 19, a memory 20, a display part 21, an image pickup device 22, and a photographing lens 23.

In FIG. 1, the MPU 11 is consisted of a micro-controller or the like and detects user's various operations from the states of the switches 11a, 11b, 11c. The MPU 11 also functions as a dividing part and a time-position changing part to be described later. Further, the MPU 11 sequentially controls each of blocks to be described later according to a program stored in the ROM 15 as a recording medium and the results of detection of the states of the switches 11a, 11b, 11c to perform a sequence of shooting or playback operations. The switches 11a-11c are provided to allow the user to enter instructions, that is, they serve as a power switch (11a) for power on and off, a release switch (11b), and a mode switching switch (11c), respectively.

The image processing part 12, the shooting position detecting part 13, the clock part 14, and the ROM 15 are connected to the MPU 11. The image processing part 12 performs processing such as color correction and signal compression. The image processing part 12 contains a switching block 12a for changing the way or amount of correction during the image processing.

The shooting position detecting part 13 can detect and record a shooting position using a satellite global positioning system (GPS) or the like. The clock part 14 as a measurement part is used to measure the exposure time, predetermined timing intervals, and the like, as well as to record the shooting date and time. The ROM 15 stores various programs executed by the MPU 11 of the camera and various adjusted values for the camera.

The analog front-end part 18, the RAM 19, the memory 20, and the display part 21 are connected to the image processing part 12. Further, the image pickup device 22 for forming an image of a subject 25 from light coming through the photographing lens 23 during shooting is connected to the analog front-end part 18. The image pickup device 22 is an imaging part mainly consisting of a CCD or CMOS sensor for photoelectrically converting the subject image to image signals.

The analog front-end part 18 performs reading and A/D conversion of the image signals photoelectrically converted. The digital image signals A/D converted through the analog front-end part 18 are input into the image processing part 12. The image processing part 12 performs various image processing on the input digital signals to create image data. The image data are recorded in the removable memory 20 as a second recording part. The image data are recorded in the memory 20 after being compressed into a suitable size of data according to the camera settings. The final form of a combined multi-picture screen featured by the present invention is also stored in the memory 20. At this time, to perform various computations, the RAM 19 as a first recording part is used to store data as appropriate. According to the present invention, moving images (continuous shots) are first stored in the RAM 19.

The display part 21 consists of an LCD and the like. The signals from the image pickup device 22 are reproduced serially in sequence to play back and display corresponding image data on the display part 21 so that the user can view and check the state of the subject 25 to decide on the framing of the subject 25. Note that the user also performs a multi-image selection described later by viewing the display part 21. In this process, the corresponding image data are read from the memory 20 in response to the user's operation of the switch 11c and processed through the image processing part 12 to create display data and display the display data on the display part 21.

In such a structure, when the user operates the switches 11a-11c, the MPU 11 detects the state of each switch to control each block sequentially according to the program stored in the ROM 15, executing a sequence of shooting or playback operations.

During shooting, an image of the subject 25 coming through the photographing lens 23 is captured by the image pickup device 22 and converted into electric signals. Then, the electric signals are A/D converted through the analog front-end part 18, and resulting digital image signals are input into the image processing part 12. After the image processing part 12 performs processing on the digital image signals, such as color correction and image compression, resulting data are recorded in the memory 20 and the shooting procedure is ended.

Figure 2A:
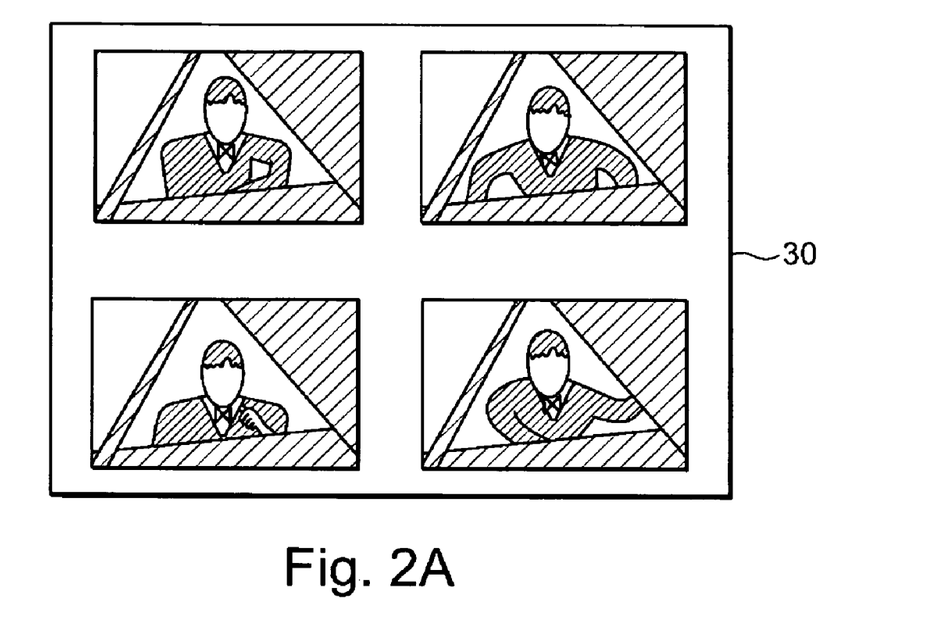
FIG. 2A is an illustration showing a four-part split screen as an example of multi-picture display.
Figure 2B:
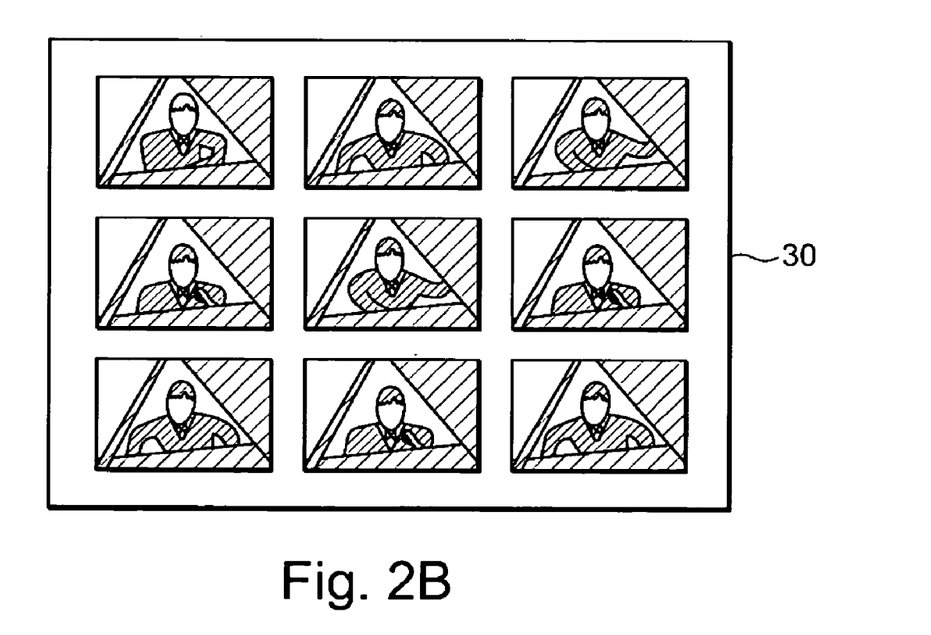
FIG. 2B is an illustration showing a nine-part split screen as another example of multi-picture display.

This embodiment discloses a technique for selecting only suitable images from a massive amount of image data recorded in a continuous shooting mode for shooting a plurality of images continuously (for example, when shooting 30 frames per second, 150 frames of image data are generated in five seconds). This technique is used to display continuous shots on one screen 30 (multi-picture display), for example, the performance of a pianist or changes in facial expression as shown in FIGS. 2A and 2B.

Figure 3A:
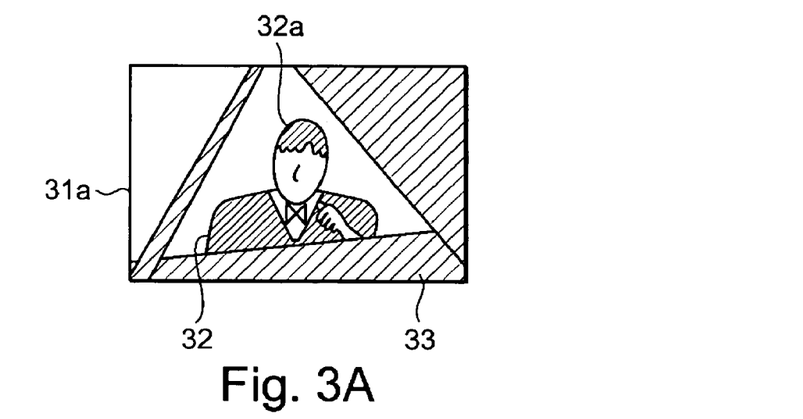
FIGS. 3A to 3C are a series of illustrations for explaining the motion of a subject.
Figure 3B:
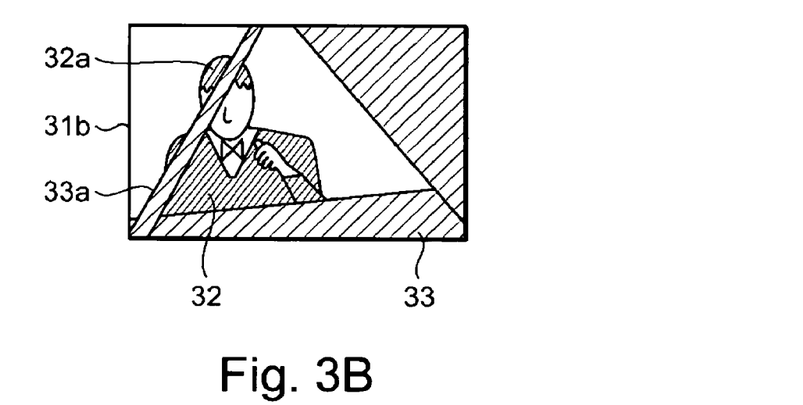
Figure 3C:
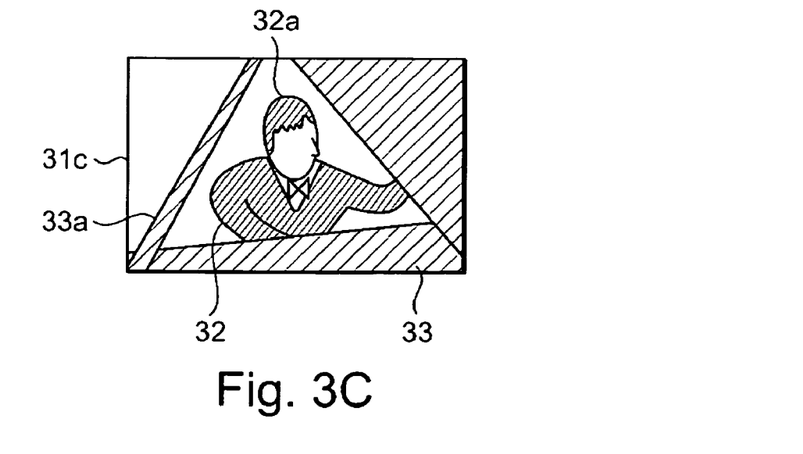

Suppose that an image 31a features a pianist as the main subject 32 as shown in FIG. 3A. However, when the pianist is moving wildly, even if a user tries to mainly take pictures like FIG. 3A, the pianist's face 32a may be hidden from view by a lid prop 33a of a piano 33 as in the case of an image 31b in FIG. 3B. Otherwise, the face 32a of the main subject 33 may turn aside as in an image 31c in FIG. 3C.

It is thus difficult for the conventional cameras to allow users to select such a shooting timing to place the subject 32 at the best position.

On the other hand, the camera in the embodiment allows users to store specific images including an image shot at the best timing in a series of continuous image shots, not just to capture all the continuous images in the series.

Figures 4A, 4B:
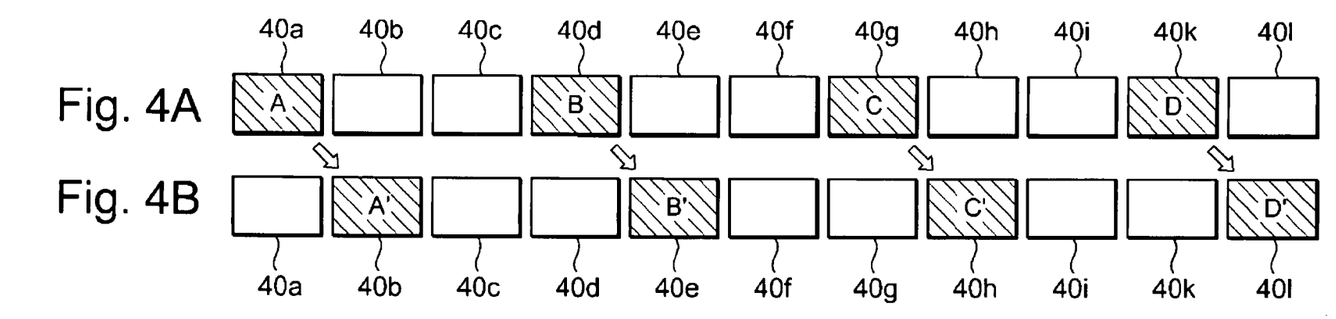
FIGS. 4A to 4D are illustrations for explaining a timing shift at the time of continuous shooting.

Specifically, as shown in FIG. 4A, four frames 40a, 40d, 40g, 40k of images A, B, C, D are selected from a series of continuous shots (frames 40a to 40l) and displayed as split views on the display part 21. In this screen-splitting process, the MPU 11 as the dividing part divides data associated with a continuous shooting period for a group of continuous image shots into approximately equal time intervals. Then, the MPU 11 as an image selection part selects image data corresponding to shooting time positions of the approximately equally divided time intervals so that the image data selected will be displayed on the display part 21. If no suitable image is available at the timing assumed in this screen-splitting process, the camera will shift the timing according to user's operations to display another set of four frames as shown in FIG. 4B. In other words, four frames 40b, 40e, 40h, 40l of images A', B', C', D' are displayed as split views on the display part 21. The timing shift for the data associated with the continuous shooting period is performed by the MPU 11 as a start-time position changing part.

Referring next to a flowchart of FIG. 5, the operation of the camera will be described. The operation of the camera is mainly controlled by the MPU 11.

When this sequence is started, the camera-setting mode is first judged in step S1. If the user has operated the camera to select a playback mode, the procedure shifts to step S23 to display on the display part 21 an image shot and recorded just before changing to the playback mode. It is then determined in step S24 whether the user wants to see another image or not. If it is determined that the user wants to see another image, the procedure goes to step S25 to change the displayed image to another, and then returns to step S24. On the other hand, if it is determined in step S24 that there is no need to change the image, the procedure goes to step S26 to display the image concern on the display part 21.

After that, the procedure proceeds to step S27 to determine whether the display processing is to be ended. If the display processing is not to be ended, the procedure returns to step S24, while if the display processing is to be ended, this sequence is terminated.

On the other hand, if a mode other than the playback mode is selected in step S1, the procedure proceeds to step S2 to determine the state of the release switch. If the release switch is not on-state, the procedure shifts to step S17 to be described later.

If the release switch is on-state, the camera enters a shooting mode starting from step S3.

The shooting mode presupposes continuous shooting, the clock part 14 first starts timer counting at step S3 to measure a shooting period. Then, at step S4, continuous shooting is started. The results of continuous shooting are recorded in the RAM 19 sequentially.

Then, in step S6, the resulting value T of timer counting starting at step S3 is compared with a predetermined count value $T_{MAX}$. The value $T_{MAX}$ is a limiter value used when the continuous shooting takes long time (i.e., when the number of frames is large). In other words, the limiter value $T_{MAX}$ indicates that the capacity of the RAM 19 runs out as a result of continuous shooting. Therefore, the limiter value $T_{MAX}$ is adjustable according to the number of frames recordable in the RAM 19. In addition, the limiter value $T_{MAX}$ can be either variable or fixed.

Then, in step S6, if it is determined that the timer count value T does not reach the limiter value $T_{MAX}$, the procedure shifts to step S10 to determine the current state of the release switch that was determined to be on-state in step S2. If the release switch remains on, it means that the camera is on its way to perform continuous shooting. Therefore, the procedure returns to step S4 to repeat the continuous shooting processing. On the other hand, if the release switch is turned off (to complete the continuous shooting processing) in step 10, the procedure proceeds to step S11 to obtain the value T as a resulting timer count value.

On the other hand, if it is determined in step S6 that the timer count value T reaches the limiter value $T_{MAX}$, the procedure proceeds to step S7. This means that the capacity of the RAM 19 runs out. Therefore, in this case, the procedure proceeds to step S7 to forcibly terminate the release processing. Then, in step S8, the display part 21 or the like is informed of the termination of the release processing, and in step S9, the timer value $T_{MAX}$ is set as the resulting timer count value T.

In other words, the continuous shooting processing continues until it is determined in step S6 that the capacity of the RAM 19 runs out, or in step S10 that the release switch is turned off.

Then, in step S12, it is determined how many parts to split the screen of the display part 21. If the four-part split screen is selected as shown in FIG. 2A, the procedure goes to step S13, while if the nine-part split screen is selected as shown in FIG. 2B, the procedure goes to step S14. The number of split views to be displayed on the display part 21 is selected according to the user's setting.

In step S13, photos obtained at the timing of the count value T divided by four are displayed on the display part 21 (see FIG. 2A). On the other hand, in step S14, photos obtained at the timing of the count value T divided by nine are displayed on the display part 21 (see FIG. 2B).

After that, the remaining storage capacity of the RMA 19 is determined in step S15. If the RAM 19 runs out of space to store images, the procedure proceeds to step S16 to display a warning on the display part 21 or the like to inform the user that the RAM 19 runs out of space. On the other hand, if the RAM 19 still has enough space, it means that the camera can perform continuous shooting. Therefore, the procedure returns to step S2 to repeat the continuous shooting processing.

After warning in step S16, or when it is determined in step S2 that the release processing is not instructed, the procedure goes to step S17 to determine the presence or absence of unprocessed data. Specifically, it is determined whether there is any other image data continuously shot and recorded in the RAM 19 as the first recording part but not recorded in the memory 20 as the second recording part yet. As a result, if all the image data corresponding to those continuously shot are already recorded in the memory 20, it means that there is no unprocessed data. Therefore, the procedure returns to step S2 to repeat the processing. On the other hand, if any unprocessed data is found, the procedure proceeds to step S18 in which photos obtained in this continuous shooting process are displayed on the display part 21 in a format as shown in FIG. 2A or FIG. 2B.

Then, it is determined in step S19 whether a photo the user likes is included in the photos displayed in step S18. The result of this determination is notified to the MPU 11 according to the user's operation of the switch 11c or the like. Here, if no photo the user likes is included in the photos displayed, the procedure proceeds to step S20 to perform a timing shift. After step 20, the procedure returns to step S18 in which another set of photos obtained in this continuous shooting process are displayed again on the display part 21.

Figure 4C:
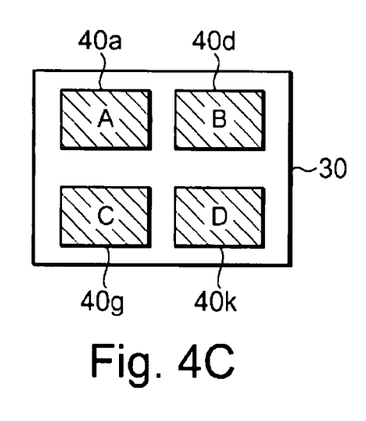
Figure 4D:
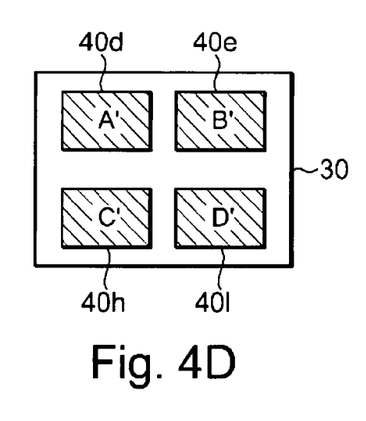

For example, if the photos first displayed in step S18 are the frames 40a, 40d, 40g, 40k of the images A, B, C, D shown in FIG. 4A, the photos are displayed on the screen 30 as shown in FIG. 4C. Then, after timing shift in step S20, the photos displayed on the screen 30 for the second time in step S18 are the frames 40b, 40e, 40h, 40l of the images A', B', C', D' as shown in FIG. 4D. In this case, the images A, B, C, D shown in FIG. 4A are shifted by one frame so that the images A', B', C', D' shown in FIG. 4B will be displayed. This enables the user to obtain a series of continuous shots including an image shot at a perfect timing.

Suppose that the photos to be displayed on the screen 30 include the last frame. In this case, for example, only images of displayable frames may be displayed, or the second-last frame, third-last frame . . . may be displayed sequentially in this order, together with and following the last frame, irrespective of the above-mentioned timing.

Although the embodiment takes a four-part split display as an example, the same holds true for a display split into nine or more parts.

Thus, images time-shifted sequentially are displayed until it is determined in step S19 that the user finds a favorite image.

Then, when it is determined in step S19 that the user finds a favorite image, the procedure goes to step S21. As a result, image data of the photos displayed as split views on the screen 30 are compressed through the image processing part 12 and recorded in the memory 20. Since the memory 20 is nonvolatile, the image data of the photos displayed as split views on the screen 30 and recorded in the memory 20 remains recorded even though, for example, a battery is removed from the camera. Then, in step S22, the image data of the continuous shots recorded in the memory 20 are erased from the RAM 19, and the procedure returns to step S17. If it is determined in step S17 that there is no unprocessed data, then the procedure returns to step S2 for next continuous shooting.

Suppose here that the continuous shooting takes short time (i.e., the number of frames recorded in the RAM 19 is less than the number of screen splits on the display screen). For example, if the number of frames is as many as the number of screen splits on the display screen, all those corresponding to the number of screen splits are displayed. Further, if the number of frames is less than the number of screen splits, all the frames acquired are displayed. The present invention is not limited to the above descriptions, alternatively, photos may be displayed in another way at the process timings (T/4 or T/9) of step 13 or S14.

Figure 6A:
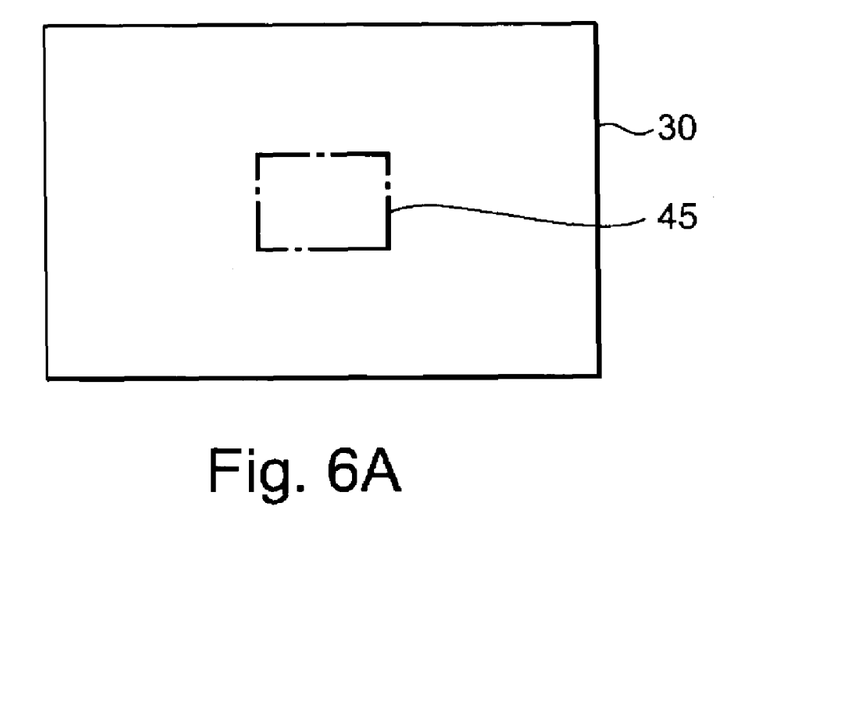
FIGS. 6A to 6B are illustrations for explaining an example of detecting a man's face image of a subject.
Figure 6B:
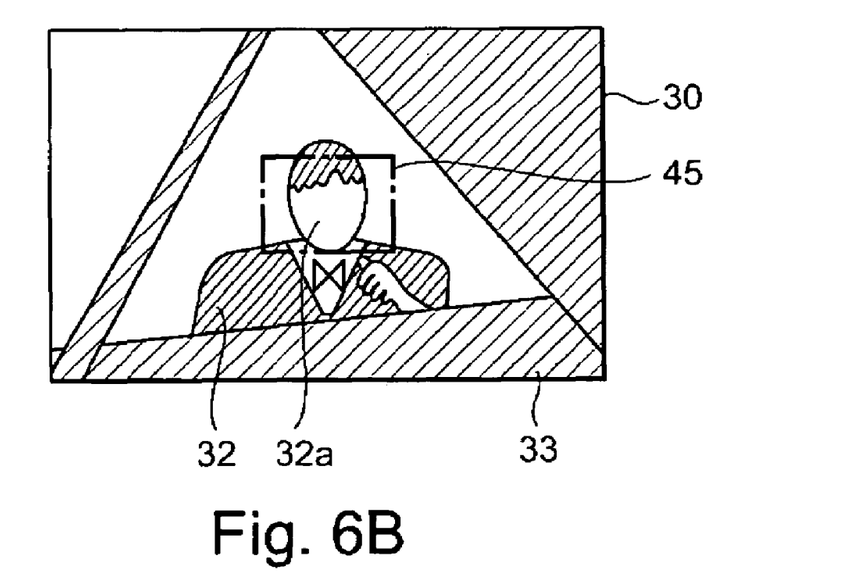

The following describes a modification of the embodiment as to how to select image data displayed as split views for the first time and image data displayed as split views for a second or further time as a result of time shifting. A technique for analyzing an image to recognize the position of a person's face has been well known in these days. This technique is to detect a predetermined face pattern from an image according to the shapes of person's eyes or nose shadow. Using such a face image detecting technique, for example, as shown in FIG. 6A, a detection frame 45 can be provided in the screen 30 to select a photo in which the face of a person as the subject fits into the detection frame 45 from a series of continuous shots. For example, in FIG. 6B, the face 32a of the pianist as the subject 32 fits in the detection frame 45. The face detection is implemented by providing a face detection portion 12b within the screen of the image processing part 12.

Figure 7A:
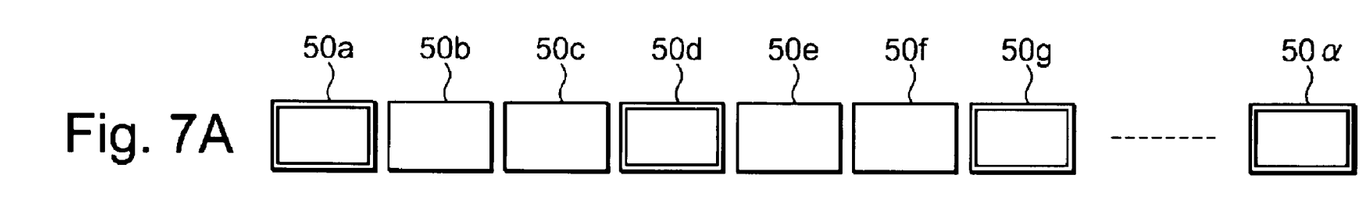
FIGS. 7A to 7C are illustrations for explaining multi-picture display using a face image detecting technique.

In other words, in the embodiment as shown in FIG. 7A, the continuous shots or the images (50a, 50d, 50g, . . . , 50α) selected at predetermined intervals (of three frames in this example,) can only be simply displayed simply as shown in FIG. 2A. In contrast, according to the modification of the embodiment, a frame (50e) detected using face detection is first selected as shown in FIG. 7B, and as shown in FIG. 7C, frames (50c and 50g in this example) before and after the selected frame are then selected, enabling a multi-picture display that gives a higher priority to user's preferences for composition.

Thus, a multi-picture display consisting of an image obtained at a perfect timing and images before and after the image showing the movement of the subject can be realized.

Figure 8:
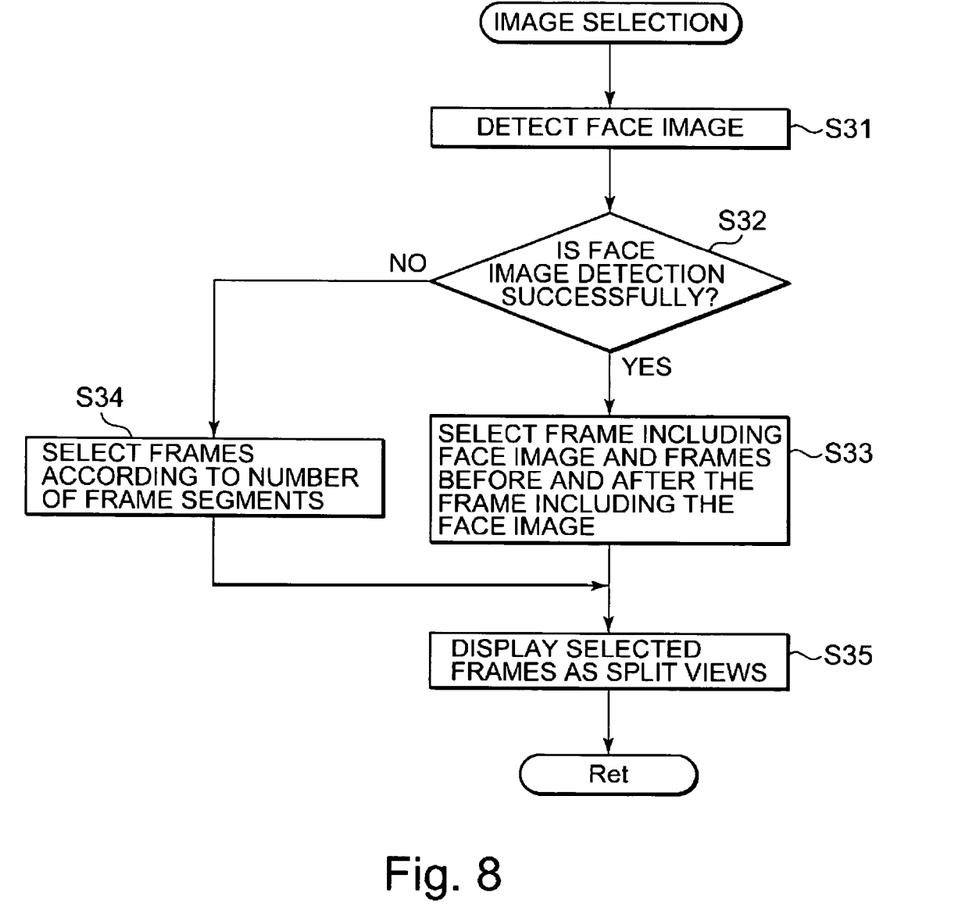
FIG. 8 is a flowchart for explaining image selection using man's face image detection.

FIG. 8 is a flowchart for explaining image selection using face image detection. The image selection is made mainly under the control of the MPU 11.

Figures 7B, 7C:
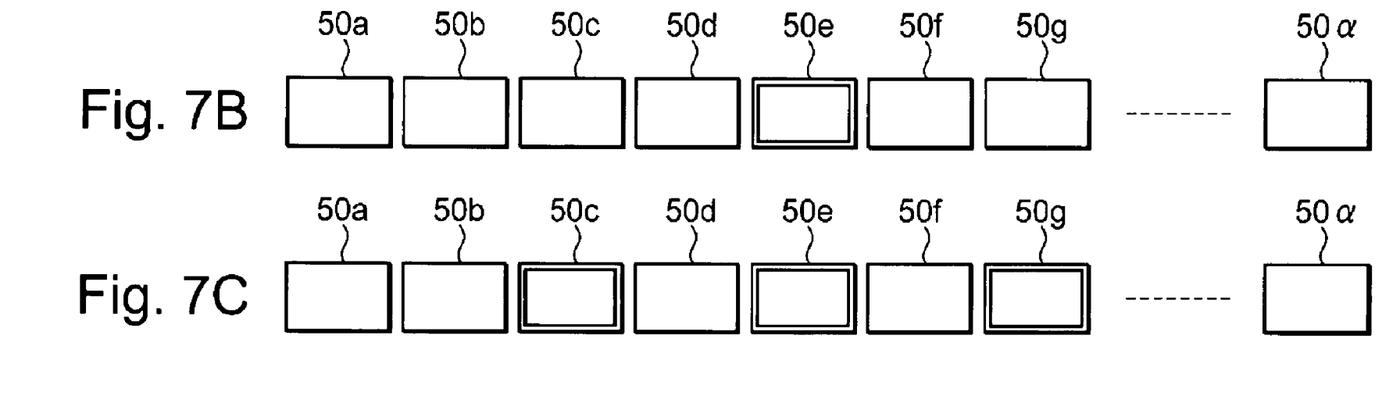

When this sequence is started, a face image is first detected in step S31 as shown in FIG. 7B. In the following step S32, a frame including the face image detected is searched to determine whether the face image is in place in the frame (at a predetermined position). This search is performed by the MPU 11 as a search part.

If the search for the face image is successful, the procedure proceeds to step S33 to select frames located on the time scale before and after the frame detected in step S31 (see FIG. 7C). This selection is made by the MPU 11 as the selection part. After that, the procedure goes to step S35 to create and display a multi-picture screen as shown in FIG. 2A or 2B.

On the other hand, if the search for the face image is failed in step S32, the procedure shifts to step S34 to select images from respective time intervals divided equally as shown in FIG. 7A. Then, the procedure proceeds to step S35 to create and display a multi-picture screen containing the images selected respectively from the time intervals equally divided.

Figure 5:
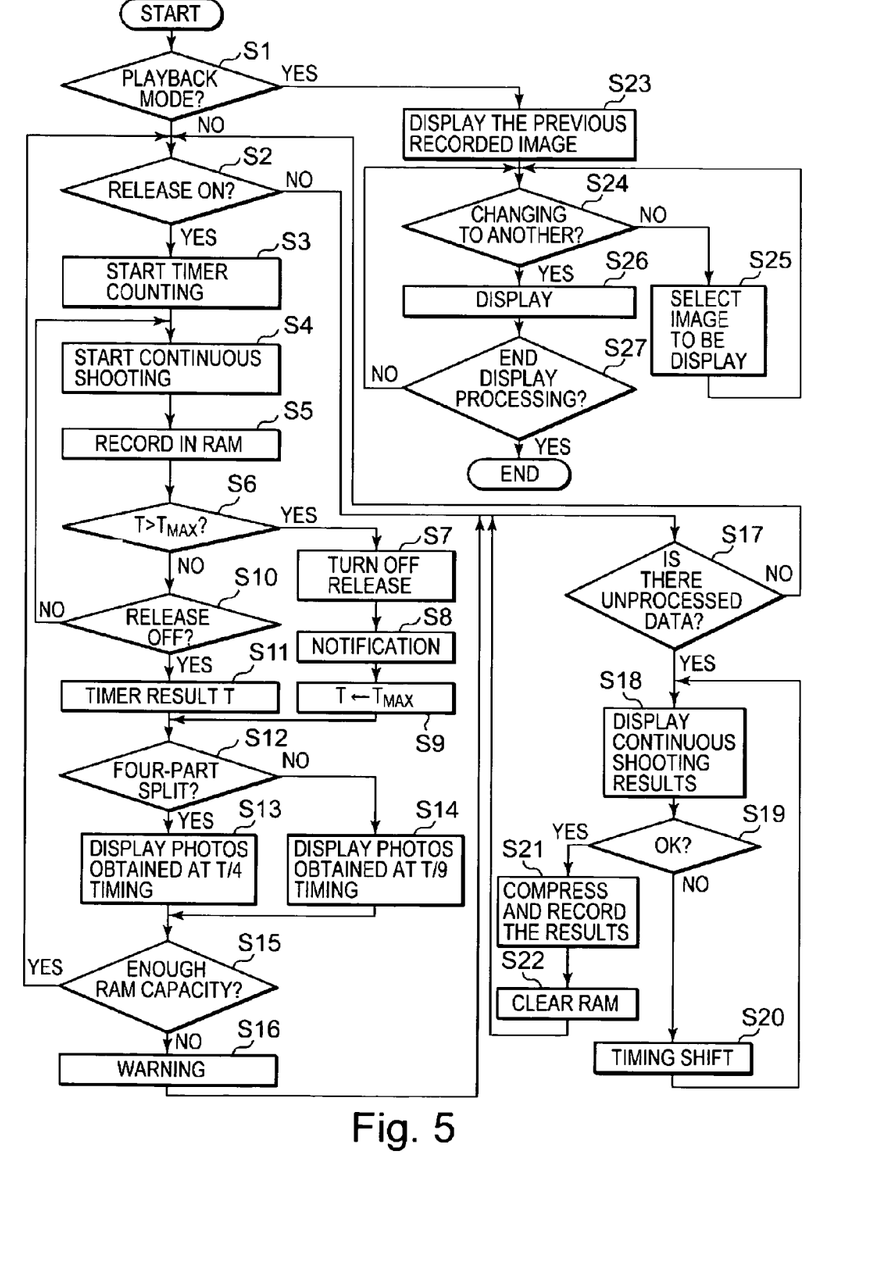
FIG. 5 is a flowchart for explaining the operation of the camera according to the embodiment of the present invention.

Thus, the camera first detects a face image, and then displays image frames including the face-image frame and frames before and after the face-image frame without requiring the user to perform some timing-shift operation like in step S20 in the flowchart of FIG. 5, enabling automatic selection of an effective multi-picture screen.

Thus, according to the embodiment, the intervals of continuous shooting and the number of frames displayed can vary so that an image shot at a perfect timing will be recorded while eliminating unnecessary memory consumption.

Note that, although only the four-part and nine-part split screens are illustrated to be displayed on the display part 21 as examples of multi-picture display, the present invention is, of course, not limited to those numbers of screen splits. Further, frames to be selected after the selection of a frame (50e in FIG. 7B) including a face image detected may not be frames before and after the frame including the face image.

Further, according to the embodiment, there can be provided a camera capable of recording images at optimal timings and displaying a frame image the user wants to record and image frames before and after the frame image on an appropriate multi-part screen. This allows the user to concentrate on shooting an image, and then new images continuously without excessive memory consumption.

As described above, the imaging apparatus according to the embodiment of the present invention records image data of continuous shots sequentially in series to display on a display part image data selected from all the image data recorded. In this selection process, data associated with the shooting period of the image data (shooting time, order of shooting, etc.) is divided into approximately equal time intervals to select image data each corresponding to shooting time positions of the approximately equally divided time intervals. As a result, plural pieces of image data equally spaced throughout the data associated with the shooting period are selectively displayed. It means that image data fairly distributed throughout the series of shot image data are selectively displayed.

Further, according to the modification of the embodiment, the following structures can be obtained.

(1) A camera having a continuous shooting function comprising:
a face detection part for detecting the position of a face in a shot image;
a search part for searching continuous shots for an image in which the face is in place; and
a multi-picture display part for displaying the image searched from the continuous shots and images before and after the searched image.

(2) A camera having a continuous shooting function comprising:
a face detection part for detecting the position of a face in a shot image;
a search part for searching continuous shots for an image in which the face is in place;
a selection part for selecting the image searched by the search part and images before and after the searched image; and
a display part for displaying the plurality of images selected by the selection part.

While there has been shown and described what is considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An imaging apparatus capable of continuous shooting under a continuous shooting mode comprising:
an imaging part for capturing a subject image to generate an image signal;
a release switch for indicating start and termination of continuous shooting;
an image processing part for creating image data according to the image signal;
a first recording part for sequentially recording the image data;
a measurement part for measuring data associated with a continuous shooting period from the start to the termination of the continuous shooting determined based on the state of the release switch;
a dividing part for dividing the continuous shooting period associated with the image data into approximately equal time intervals;
an image selection part for selecting, from among the image data recorded in the first recording part, image data corresponding to shooting time positions of the approximately equally divided time intervals;

a display part for displaying the image data selected; and a second recording part for recording only the data associated with the image data selected by the image selection part from among the image data recorded in the first recording part.

2. The imaging apparatus according to claim 1 wherein the data associated with a shooting period are measured from a time or frame determined to be the start of the shooting to a time or frame determined to be the end of the shooting.

3. The imaging apparatus according to claim 1 further comprising a start-time position changing part for changing data associated with the shooting start-time position among the data associated with the shooting period, wherein the image selection part performs re-selection of the image data corresponding to shooting time positions of the approximately equally divided time intervals from among the image data after the change of the shooting start-time.

4. The imaging apparatus according to claim 1 wherein the dividing part divides the shooting period into approximately equal intervals by using a predetermined number of images.

5. The imaging apparatus according to claim 1 wherein the start of measuring the shooting period by the measurement part can be shifted by a time interval shorter than the approximately equally divided time.

6. The imaging apparatus according to claim 1 further comprising a face detection part for detecting the position of a face in a shot image, wherein the dividing part selects an image that has a face in a predetermined position as one of dividing positions.

7. The imaging apparatus according to claim 1 further comprising:

a determining part for determining whether the image data displayed on the display part include a photo according to a user's switching operation, wherein the image data, selected by the image selection part from among the image data recorded in the first recording part and displayed on the display part, are compressed by the image processor and recorded into the second recording part, when it is determined that the photo selected by user is included.

8. An imaging method for an imaging apparatus capable of continuous shooting under a continuous shooting mode, the method comprising:

capturing a subject image to generate an image signal;

indicating, by release switch, start and termination of continuous shooting;

creating image data according to the image signal generated;

recording the created image data sequentially in a first memory;

measuring a continuous shooting period from the start to the termination of the continuous shooting determined based on the state of the release switch;

dividing the continuous shooting period into approximately equal time intervals;

selecting, by an image selection part, from among the image data recorded in the first memory, image data corresponding to shooting time positions of the approximately equally divided time intervals;

displaying the image data selected; and recording, in a second memory, only the data associated with the image data selected by the image selection part from among the image data recorded in the first memory.

9. The imaging method according to claim 8 further comprising:

determining whether the image data displayed on the display part include a photo selected according to a user's switching operation, wherein the image data, selected by the image selection part from among the image data recorded in the first memory and displayed on the display part, are compressed by the image processor and recorded into the second memory, when it is determined that the photo selected by user is included.

10. An imaging method for an imaging apparatus capable of continuous shooting under a continuous shooting mode, the method comprising:

storing data of a group of continuously shot images in a RAM;

selecting a plurality of images from the RAM;

displaying the plurality of selected images on a display; and accepting user's input with respect to the images on the display, wherein the method selectively executes, according to the user's input, either (1) recording only the image data of the plurality of images on the display, from among the image data of the plurality of images recorded in the RAM, in a removable nonvolatile memory, or (2) re-selecting a plurality of images different from the plurality of selected images on the display and displaying the plurality of re-selected images.

11. The imaging method according to claim 10 wherein the selection of the plurality of images from the RAM is made by dividing the group of continuously shot images into approximately equal image blocks based on shooting time data.

12. The imaging method according to claim 10 wherein the selection of the plurality of images from the RAM includes the selection of an image in which a man's face is in a predetermined place.

13. A computer-readable recording medium recording a shooting program from an imaging apparatus capable of continuous shooting under a continuous shooting mode, the program allowing the imaging apparatus to execute:

generating an image signal based on a subject image captured;

creating image data according to the image signal generated;

recording the created image data sequentially in a first memory;

measuring data associated with a continuous shooting period from start to termination of continuous shooting determined based on the state of a release switch for indicating the start and the termination of continuous shooting;

dividing the continuous shooting period into approximately equal time intervals;

selecting, by an image selection part from among the image data recorded in the first memory, image data corresponding to a shooting time position of the approximately equally divided time intervals;

displaying the image data selected; and recording, in a second recording part, the only data associated with the image data selected by the image selection part from among the image data recorded in the first memory.

* * * * *